United States Patent

[11] 3,573,673

[72] Inventors Adrian J. De Vries
Elmhurst;
Fleming Dias, Chicago; Thomas J. Wojcik,
Mount Prospect, Ill.
[21] Appl. No. 789,839
[22] Filed Jan. 8, 1969
[45] Patented Apr. 6, 1971
[73] Assignee Zenith Radio Corporation
Chicago, Ill.

[54] ACOUSTIC SURFACE WAVE FILTERS
7 Claims, 7 Drawing Figs.

[52] U.S. Cl. .......... 333/72, 333/30
[51] Int. Cl. .......... H03h 9/20
[50] Field of Search .......... 333/72, 30; 310/9.4—9.8; 343/10, 17.2

[56] References Cited
UNITED STATES PATENTS

| | | | |
|---|---|---|---|
| 1,990,822 | 2/1935 | Goldstine | 310/9.7X |
| 2,262,966 | 11/1941 | Rohde | 333/72X |
| 3,209,178 | 9/1965 | Koneval | 310/9.8X |
| 3,376,572 | 4/1968 | Mayo | 333/72X |
| 3,489,932 | 1/1970 | Kopel et al | 310/8.3X |

*Primary Examiner*—Herman Karl Saalbach
*Assistant Examiner*—Marvin Nussbaum
*Attorney*—Francis W. Crotty

ABSTRACT: A body of piezoelectric material is capable of propagating acoustic surface waves and a first transducing device is coupled to a surface of the body to develop those waves. Spaced on the same surface from that first device is a second transducing device. The spacing is sufficiently small that crosstalk exists between the devices. To reduce the magnitude of that crosstalk, one or more of several different decoupling arrangements are included. These comprise the connection of diametrically opposite transducer electrodes to a common plane of reference potential, the connection of the mutually closest electrodes of the respective transducers to a plane of common reference potential, the disposition of one or more ground electrodes between the transducers and across the path of wave propagation, the development across the transducers of signals balanced with respect to such a plane, the physical shielding of the space generally above one of the transducers, the inclusion of a conductive shield on the surface opposite the wave-propagating surface and the formation of shielding channels in that surface opposite the wave-propagating surface. In addition, the wave propagation path advantageously is caused to be oriented at an angle relative to the end surfaces of the piezoelectric body in order to minimize reflected wave interference.

Patented April 6, 1971 3,573,673

2 Sheets-Sheet 1

Inventors
Adrian J. De Vries
Fleming Dias
Thomas J. Wojcik
By Francis W. Crotty
Attorney Inventors
Adrian J. De Vries
Fleming Dias
Thomas J. Wojcik
By Francis W. Crotty
Attorney

ACOUSTIC SURFACE WAVE FILTERS

This invention pertains to acousto-electric filters. More particularly, it relates to solid-state tuned circuitry which involves interaction between a transducer device coupled to a piezoelectric material and acoustic waves propagated on that material.

In copending application Ser. No. 721,038, filed Apr. 12, 1968, and assigned to the assignee of the present application, there are disclosed and claimed a number of different acousto-electric devices in which acoustic surface waves propagating in a piezoelectric material interact with transducers coupled to the surface waves. In each of the devices particularly disclosed in that application, the surface waves launched on the body of piezoelectric material are caused, in one manner or another, to interact with a second transducer spaced along the surface from the first. In the simplest case, the first transducer is coupled to a source of signals while the second transducer is coupled to a load, the signal energy being translated by the acoustic waves between the two transducers.

In practice, such devices have been demonstrated to exhibit characteristics useable in a number of different applications, In a television receiver, for example, acoustic filter systems have been included in the IF channel in order to impose a desired IF characteristic with traps or null points at selected frequencies spaced from the IF carrier frequency and determined by the structure of the acoustic filters included in the system. As another example, an acoustic filter system may serve in an FM receiver as the discriminator to perform the necessary function of converting frequency changes of a carrier wave signal to amplitude changes.

While the demonstrations of acoustic filters in such applications thus far have been highly encouraging, one difficulty encountered has been that denoted by the term "crosstalk," that is to say, an interaction of two or more signals which may reach the output transducer. One is the signal traveling on the surface of the piezoelectric body and the time it takes the surface wave to traverse the distance between the input and output transducers constitutes a time delay in the transmission of the signal through the device. While this is of no concern in many applications, and even is desirable in others, it has been discovered that the output transducer also develops a second signal potential that is not delayed the same as the first. The dual presence of these unequally delayed signals is undesirable. It results in double images or "ghosts" in television systems, reduces selectivity and otherwise interferes with the desired signal in other systems.

It is, accordingly, a general object of the present invention to provide acousto-electric filters in which crosstalk is eliminated or at least substantially reduced.

A further object of the present invention is to provide crosstalk elimination means which are fully compatible with integrated circuit techniques.

An acoustic filter in accordance with the present invention includes a body of piezoelectric material propagative of acoustic surface waves along a surface thereof. A first surface wave interaction device is actively coupled to a portion of that surface and interacts with the body over a predetermined frequency range; a second surface wave interaction device is actively coupled to a portion of the surface spaced from the first device by a distance along said surface sufficiently small to effect passive coupling between the devices over the aforementioned frequency range. Finally, the filter includes decoupling means coupled to a plane of reference potential for reducing the magnitude of that passive coupling.

The features of the present invention which are believed to be novel are set forth with particularity in the appended claims.

The organization and manner of operation of the invention, together with further objects and advantages thereof, may best be understood by reference to the following description taken in conjunction with the accompanying drawings, in the several FIGS. of which like reference numerals identify like elements and in which.

Figure 1:
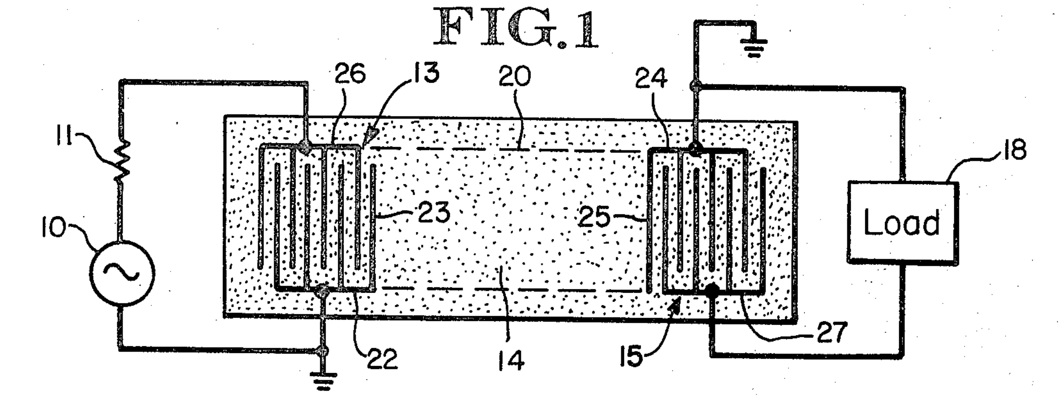
FIG. 1 is a partly schematic plan view of one embodiment of an acoustic filter system.

In FIG. 1, a signal source 10 in series with a resistor 11, which may represent the internal impedance of that source, is connected across an input transducer or surface wave interaction device 13 mechanically coupled to one major surface of a body of piezoelectric material in the form of a substrate 14. An output or second portion of the same surface of substrate 14 is, in turn, mechanically coupled to an output transducer 15 which is coupled across a load 18.

Transducers 13 and 15 in the simplest arrangement are identical and are constructed of two comb-type electrode arrays. The stripes or conductive elements of one comb are interleaved with the stripes of the other. The electrodes are of a material such as gold or aluminum which may be vacuum deposited on a smoothly lapped and polished planar surface of the piezoelectric body. The piezoelectric material is one, such as PZT or quartz, that is propagative of acoustic waves. The distance between the centers of two consecutive stripes in each array is one-half of the acoustic wavelength of the signal wave for which it is desired to achieve maximum response. In FIG. 1, as in FIGS. 2—4, the comb arrays are but schematically illustrated. A more pictorial view of a typical arrangement is given by FIG. 7.

Direct piezoelectric surface wave transduction is accomplished by the spatially periodic interdigital electrodes of transducer 13. Considering this device as a transmitter, a periodic electric field is produced when a signal from source 10 is fed to the electrodes and, through piezoelectric coupling, the electric signal is transduced to a traveling acoustic surface wave on substrate 14. This occurs when the stress components produced by the electric field in the piezoelectric substrate are substantially matched to the stress components associated with the surface wave mode. Source 10, for example a portion of a television receiver, produces a range of signal frequencies, but due to the selective nature of the filter arrangement only a particular frequency and its intelligence-carrying sidebands are converted to a surface wave. More specifically, source 10 may be the tunable front end of a television receiver which selects a desired program signal for application to load 18 that, in this environment, comprises those stages of a television receiver subsequent to the IF stages that respond to the program signal in producing a television image and its associated audio program. The surface wave resulting in substrate 14 in response to the energization of transducer 13 by the IF output signal from source 10 is translated along the substrate to output transducer 15 where it is converted to an electrical output signal for application to load 18.

In a typical television IF embodiment, utilizing PZT as the piezoelectric substrate, the stripes of both transducer 13 and transducer 15 are approximately 0.5 mil wide and are separated by 0.5 mil for the application of an IF signal in the typical range of 40—46 megahertz. The spacing between transducer 13 and transducer 15 is on the order of 60 mils and the width of the wave front is approximately 0.1 inch. This structure of transducers 13, 15 and substrate 14 can be compared to a cascade of two tuned circuits with a resonant frequency of approximately 40 megahertz, the resonant frequency being determined, at least to a first order, by the spacing of the stripes.

The potential developed between any given pair of successive stripes in electrode array 13 produces two waves traveling along the surface of substrate 14, in opposing directions perpendicular to the stripes for the illustrative isotropic case of a ceramic poled perpendicularly to the surface. When the distance between the stripes is one-half of the acoustic wavelength of the wave at the desired input frequency, or an odd multiple thereof, relative maxima of the output wave are produced by piezoelectric transduction in interaction device 15. For increased selectivity, additional electrode stripes are added to the comb patterns of devices 13 and 15. Further modifications and adjustments are described in the aforementioned copending application for the purpose of particularly shaping the response presented by the filter to the transmitted signal. Moreover, as disclosed and claimed in copending application Ser. No. 817,093 filed Apr. 17, 1969, the entire region of substrate 14 need not be piezoelectric; it is sufficient, and sometimes desirable, to have the piezoelectric property exhibited only directly under the comb arrays.

Transducers 13 and 15 define therebetween a wave propagation path 20 indicated by the dashed lines in FIG. 1. Since a finite time interval is required for a wave launched by transducer 13 to reach transducer 15, the transmitted signals are delayed during their passage through the filter. At the same time, it has been discovered that additional signals are directly transmitted, in a manner to be discussed, from transducer 13 to transducer 15 without encountering that time delay. Consequently, two sets of signals from source 10 are presented to load 18, one of which is delayed in time relative to the other, giving rise to crosstalk. This crosstalk phenomenon is in many applications undesirable in that the one signal tends to detract from or interfere with the other. In a television receiver, for example, the nondelayed signal will appear as a generally weaker image slightly displaced in the horizontal direction to the left of the desired image. This undesirable second image is similar to that which is commonly referred to as a "ghost." That may occur by reason of multipath transmission to the receiver. While the signal level of the nondelayed signal which is passively coupled between the transducers typically is 15—20 db. below that of the desired signal, it still is sufficient to render the filters unusable in certain applications.

It has been found that the passive coupling which enables the direct, nondelayed transfer of the signal between the transducers is due primarily to electrostatic coupling within the piezoelectric substrate itself and also exists by reason of coupling from the input to the output side through elements adjacent to the substrate. The filter elements are extremely small; the transducers typically are only 50—60 mils apart, and the crosstalk level is a function of this close spacing. Moreover, the filters are characterized by low-impedance, high-current operation; as a result, the crosstalk signal is readily coupled by impedances in the associated circuitry that are common to the input and output transducing circuits.

In order to eliminate the undesired crosstalk signal, or at least to reduce the magnitude of the influence of that signal on the operation of the system, the acoustic filter includes a further arrangement that introduces a decoupling effect at the signal frequency. A number of different arrangements for this purpose will be discussed hereinafter. It is to be understood that each may be used alone or that two or more of them may be simultaneously employed in the same filter where a higher degree of attenuation of the unwanted passively coupled signal is desired or necessitated.

As indicated above, the crosstalk difficulty arises in part by reason of capacitive coupling between the input and output transducers. Such coupling is a function of both the dielectric constant of the piezoelectric material and the spacing between the transducers, and typical materials such as PZT exhibit comparatively high dielectric constants in the order of 300 to 1,000. To begin with, such undesired coupling may, of course, be reduced by lengthening the overall physical size of the filter to the end that the spacing between the transducers is increased. However, that solution generally is undesirable because the greater path length increases the attenuation suffered by the acoustic surface waves as they travel the greater distance. It also detracts from the advantage of miniaturization offered by the use of integrated-circuit techniques to which the filter readily lends itself. Increasing the spacing between the transducers also causes the surface wave signal to undergo a larger delay in being transmitted through the filter, and this is undesirable in many applications.

Another source of crosstalk is bulk waves produced concurrently in the piezoelectric body with the desired surface waves. These bulk waves, which may be either in the compressional or the shear mode, travel through the body of the material at a different velocity and follow a different path than the surface wave so as to arrive at the output transducers at a time different from that of the surface waves. Generally speaking, the bulk-wave effect can be minimized by increasing the thickness of the piezoelectric substrate.

Related to the crosstalk problem is the actual configuration of the transducer electrode patterns. As indicated previously, the selectivity of the filter may be increased by increasing the number of teeth in the comb arrays; at the same time, however, this increases the capacitive coupling between the transducers. Similarly, the transducer arrays may be made wider so as to increase the transducer impedance level, but this likewise increases the capacitive coupling between the transducers. Generally speaking, then, the number of teeth in the comb is determined by selectivity considerations while the comb width is selected to achieve the desired impedance level.

To reduce the magnitude of undesired passive coupling between the transducers and minimize its contribution to crosstalk, while at the same time affording greater flexibility in the choice of such design parameters as transducer spacing and width, the filter of FIG. 1 is arranged so that diametrically opposite portions of transducers 13 and 15 are coupled to a plane of reference potential such as ground. More specifically, transducer 13 includes as part of its signal-developing array a common electrode 22 at one side of path 20 and from which the actual signal-developing elements or teeth 23 project; opposite electrode 22 is another common electrode 26. Similarly, transducer 15 has a common electrode 24 from which one set of its elements 25 project and which is disposed at the opposite side of path 20 from electrode 22; opposite electrode 24 is the other common electrode 27 of transducer 15. Common electrodes 22 and 24 are both coupled to ground.

The potential induced on one electrode by another is reduced as the spacing therebetween is increased simply because the density of the field lines between the two electrodes decreases as the distance between them increases. Accordingly, the coupling between electrode 26 and electrode 24 is stronger than the coupling between more greatly spaced electrodes 26 and 27. Even though electrode 26 has a potential elevated with respect to ground, the connection of electrode 24 to ground precludes the inducing therein of a potential generated by electrode 26, in spite of the fact that electrodes 24 and 26 are, relatively, closely coupled. While coupling exists between electrodes 26 and 27, it is weaker by reason of the greater distance between those two electrodes. As a consequence, the total coupling between the transducers is reduced by grounding diametrically opposite sides of the transducers.

As a further improvement in the minimization of undesired passive coupling of the crosstalk signal, the closest signal-developing elements respectively of transducers 13 and 15 are both coupled to ground. As shown in FIG. 1, this is accomplished by arranging the layout of the comb arrays so that the innermost ones of elements 23 and 25 that directly face one another are each connected to ground. As so arranged, these shielding elements 23 and 25 act effectively as electrostatic shields between transducers 13 and 15 while yet also serving respectively as part of the signal-developing electrode assembly of each of the two transducers.

Figure 2:
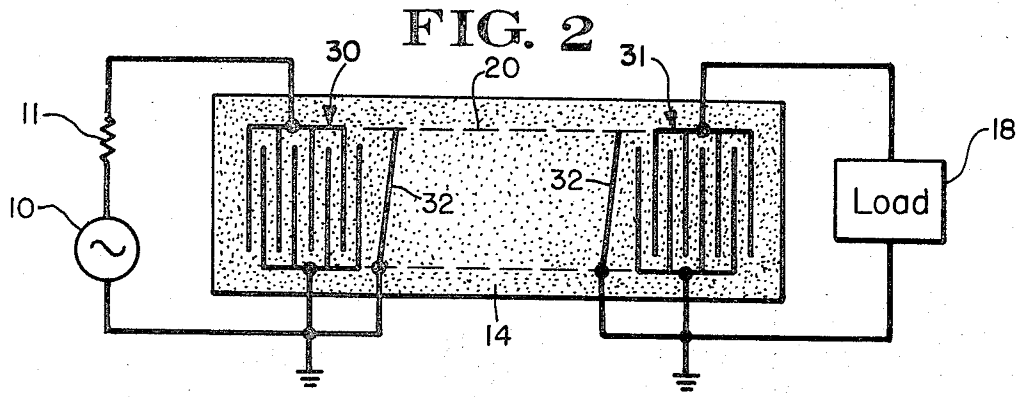
FIG. 2 is a partly schematic plan view of another embodiment of an acoustic filter system.

The filter of FIG. 2 is quite similar in construction and arrangement to that of FIG. 1 in that it includes an input transducer or wave interaction device 30 across which source 10 is coupled and an output transducer 31 that is coupled to load 18. As in the embodiment of FIG. 1, the innermost ones of the comb electrodes create planes of reference potential between the two transducers but in FIG. 2 the shielding effect is increased by locating a plane or planes of fixed reference potential more toward the middle of the space between transducers 30 and 31. This is accomplished by providing at least one and preferably a pair of shield elements 32 each of which is connected to ground and disposed across path 20 in the space between transducers 30 and 31. Electrodes 32 are more effective in shielding than the innermost electrodes of the comb structures for the additional reason that they operate very close to ground potential. While all of these electrodes are connected only through finite lead resistances and inductances, the absence of signal currents in electrodes 32 results in minimizing the potential of those electrodes that otherwise might create coupling fields to other electrodes.

The presence of undesirable surface wave reflections from elements 32 may be minimized by depositing these elements in the form of extremely thin lines. However, their thickness generally represents a compromise between providing a sufficient area at ground potential to achieve adequate shunting to ground of the signals which otherwise produce crosstalk while at the same time not diverting away an excessive amount of the signal energy desirably utilized for transmitting the signals by adding a large value of capacitance to ground in parallel with the transducers. Consequently, it is further contemplated to obviate difficulty from waves reflected from shields 32 by depositing them so as to lie at an acute angle with respect to the direction of surface wave propagation along path 20. Reflected waves are thereby caused to approach transducers 30 and 31 at an angle to the teeth in the comb arrays as a result of which there is minimal interaction between the transducers and those reflected waves.

Figure 3:
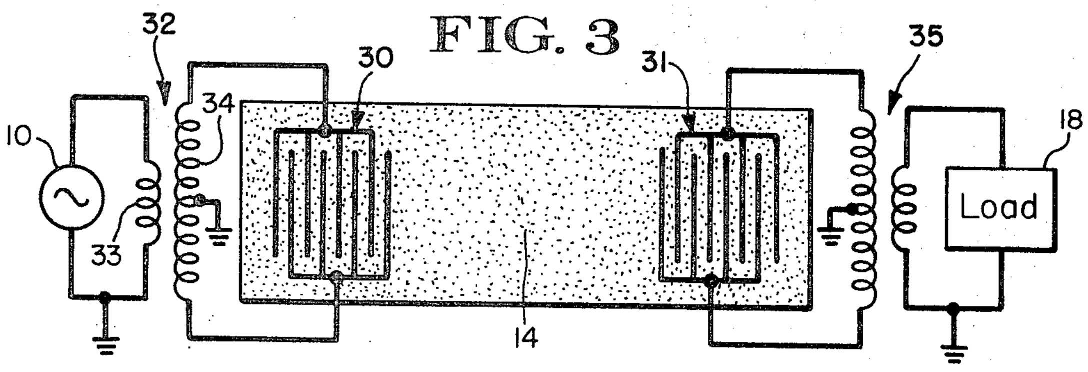
FIG. 3 is a partly schematic plan view of a further embodiment of such a system.

Additional or alternative crosstalk reduction is obtained in the approach of FIG. 3 by balancing opposite polarity signal components. This permits reduction of the crosstalk-producing signal level while not affecting the surface-wave-producing signal level. In this approach, at least one of transducers 30 and 31, and preferably both as illustrated, are coupled to their respective source or load by circuitry which causes the signals developed across the transducers to be balanced with respect to ground. Thus, transducer 30 is driven from source 10 in push-pull by a transformer 32 having an unbalances primary winding 33 coupled to source 10 together with a secondary winding 34 center-tapped to ground and across the ends of which the opposing comb arrays of transducer 30 are respectively connected. Similarly, output transducer 31 is coupled to load 18 by means of a transducer 35 which converts between signals balanced with respect to ground across transducer 31 and unbalanced signals fed to load 18.

Accordingly, if the signal potential developed across transducer 30 has a total magnitude of 2 volts insofar as the development of the surface waves is concerned, that potential with respect to ground is separated into two components respectively of plus and minus 1-volt potential. Thus, the crosstalk contributions of those two components are equal but of opposing, and hence cancelling, polarities.

Figure 4:
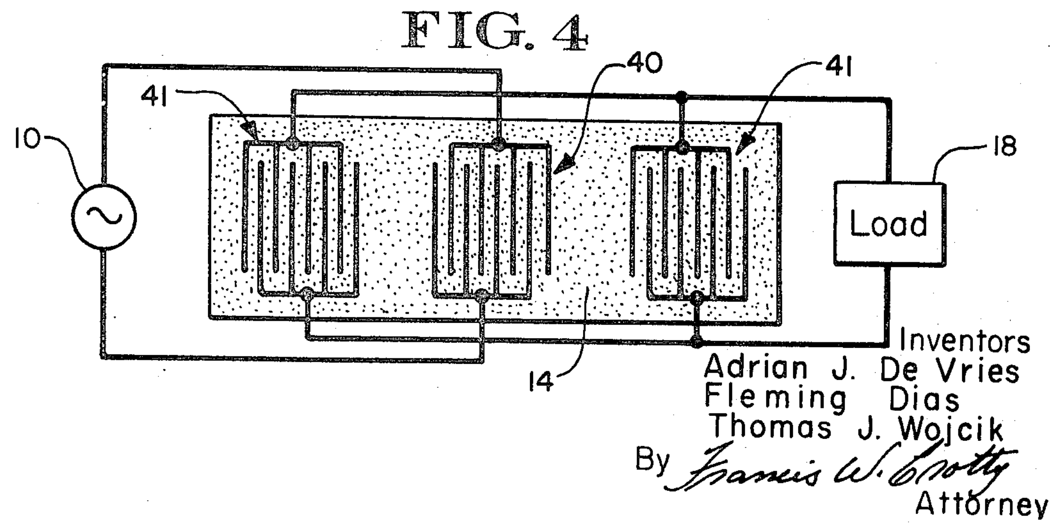
FIG. 4 is a partly schematic plan view of yet another embodiment of an acoustic filter system.

As also described in the aforementioned copending application, one desirable filter construction is that shown in FIG. 4 in which signal source 10 is coupled to a first surface wave transducer 40 disposed generally in the center of substrate 14 and which launches surface waves simultaneously toward both end surfaces of the substrate near each of which are individual output transducers 41. Output transducers 41 are coupled in common across load 18. This construction is advantageous because it utilizes the surface waves inherently produced in both directions from the input transducer. In contrast, the structure of FIGS. 1—3 do not, without special further arrangements, make any use of the surface waves developed by the "backside" of their input transducers.

By disposing input transducer 40 between the pair of output transducers 41 in FIG. 4, a signal gain of approximately 3 db. is obtained by virtue of utilizing the waves propagated in both directions by the input transducer. Apart from this advantage, it may also be noted that in certain other applications the general transducer arrangement of FIG. 4 may be employed in a system wherein transducer 40 is the output transducer and the other two transducers 41 serve as combined input transducers In any event, the structure of FIG. 4 has been described herein so as to facilitate an understanding of the preferred transducer arrangements utilized in FIGS. 5, 6 and 7 that are next to be discussed.

Figure 5:
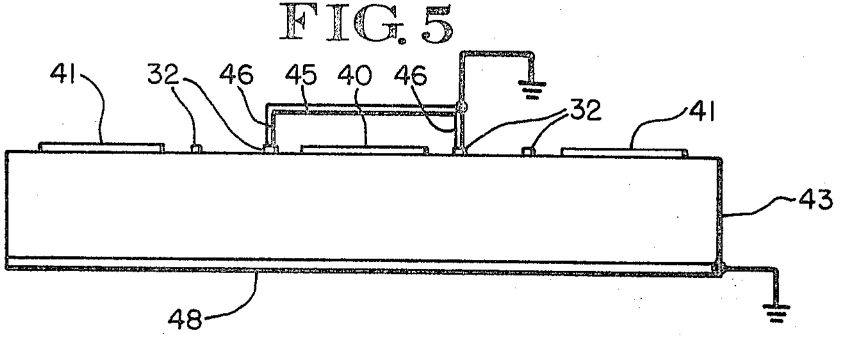
FIG. 5 is a partly schematic side elevational view of still another embodiment of an acoustic filter system.

FIG. 5 includes the arrangement of input transducer 40 and a pair of output transducers 41 symmetrically disposed with respect thereto on the planar wave-propagating surface of a piezoelectric substrate 43. Also included on the wave-propagating surface in a position between the different transducers are shields 32 which function to reduce crosstalk level in the manner already discussed with respect to FIG. 2. To reduce parasitic coupling between the transducers by virtue of the presence of nearby elements external to the filter assembly itself, an electrically conductive shield 45 is disposed above the wave-propagating surface and is formed physically to substantially cover input transducer 40 in this case. Shield 45 is connected to ground and thereby serves as another plane of reference potential situated between the input and output transducers so as to prevent the direct transfer of crosstalk signals by way of parasitic coupling. In principle, a degree of reduction of such coupling is obtainable by employing only the vertical wall portions 46 of shield 45, although more effective results generally are obtained by including the entire shield. For convenience in this case, shield 45 is mounted upon and thereby supported from one pair of shields 32.

As another and additional mode of decreasing crosstalk, the filter of FIG. 5 also includes an electrically conductive shield 48 disposed on at least a portion of, and in this case entirely along the length of, the surface of substrate 43 opposite the wave-propagating surface on which the input and output transducers are disposed. Again, shield 48 is connected to ground. In one construction, shield 48 is simply a brass plate. Particularly when substrate 43 has a high dielectric constant, shield 48 may be evaporated directly onto the substrate; by virtue of the intimate contact with the substrate, this approach is quite effective. Preferably, the thickness of substrate 43, in the direction between the transducer surface and shield 48, is less than the distance between the adjacent transducers. In this way, it is difficult for the field lines emanating from one transducer to penetrate into the region of the other transducer. Thus, a portion of the signal energy which otherwise would be parasitically coupled directly between the transducers as crosstalk is instead shunted to ground by way of shield 48.

As indicated earlier, substrate 43 preferably is thicker than otherwise would be the case in order to minimize additional undesired signal coupling between the transducers by virtue of the transmission of bulk waves within the body of the substrate. To the extent that this improvement is implemented, the effect of shield 48 is somewhat reduced because it then must be spaced farther from the transducers. While still suitable in some applications, the presence of shield 48 is at the same time disadvantageous in others because of the overall desired signal attenuation arising form the additional shunt capacitance in the system. The arrangement of FIG. 6 permits the use of a thicker substrate 50, to aid in inhibiting the transmission of undesired bulk waves, while at the same time minimizing electrostatic coupling between the transducers in a manner which does not appreciably increase the overall shunt capacitance of the filter.

Figure 6:
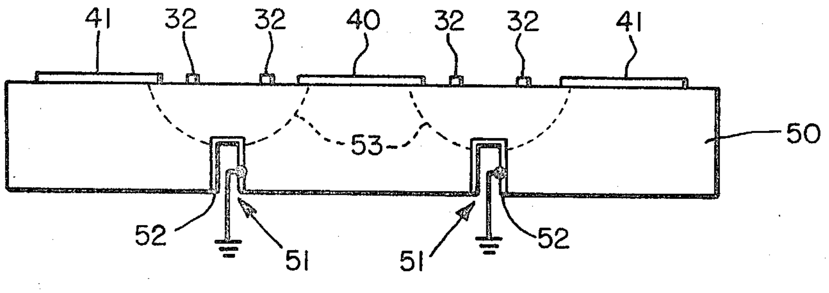
FIG. 6 is a still further embodiment of such a system shown by means of a partly schematic side elevational view.

In FIG. 6, the arrangement of transducers 40 and 41 is the same as described with respect to FIG. 5 and the filter also includes shields 32 as previously described. Cut into the bottom surface of substrate 50 opposite the upper, wave-propagating surface are at least one and, as shown, preferably a pair of channels 51 and walls and bottom of each of which in this case are coated with an electrically conductive layer 52 that is connected to ground so as to serve as an electrostatic shield. Channels 51 are disposed in a direction lateral to the wave propagation path between the transducers and preferably are individually located intermediate transducer 40 and the respective ones of transducers 41. In operation, the signal potentials developed on the transducers tend to create electrostatic field lines in the body of substrate 50 generally as indicated by dashed lines 53. Shields 52 interrupt the paths of some of those field lines directly. Being grounded, they also tend to divert field lines which otherwise would extend between the transducers, so that, instead, they extend only from each of the transducers to ground.

Accordingly, direct parasitic coupling between the transducers is effectively eliminated or at least substantially reduced in magnitude. At the same time, channels 51 are also advantageous in that they further inhibit the transmission within substrate 50 of undesirable bulk waves. Instead of having a conductive coating upon the walls, channels 51 may be entirely filled with a conductive medium. It is also significant to note that the portion of the shields located in the bottom of the channel is of primary importance. Consequently, it is only necessary to include that part of each of the shields in order to obtain a major reduction in the undesired crosstalk. On the other hand, in applications where no additional shunt capacitance can be tolerated, channels 51 are still advantageous without the presence of any conductive filling. With just air or other low dielectric constant material in the grooves, they act as additional series capacitors between the transducers so as to reduce the overall capacitance therebetween that otherwise acts to couple the undesired crosstalk signals.

Figure 7:
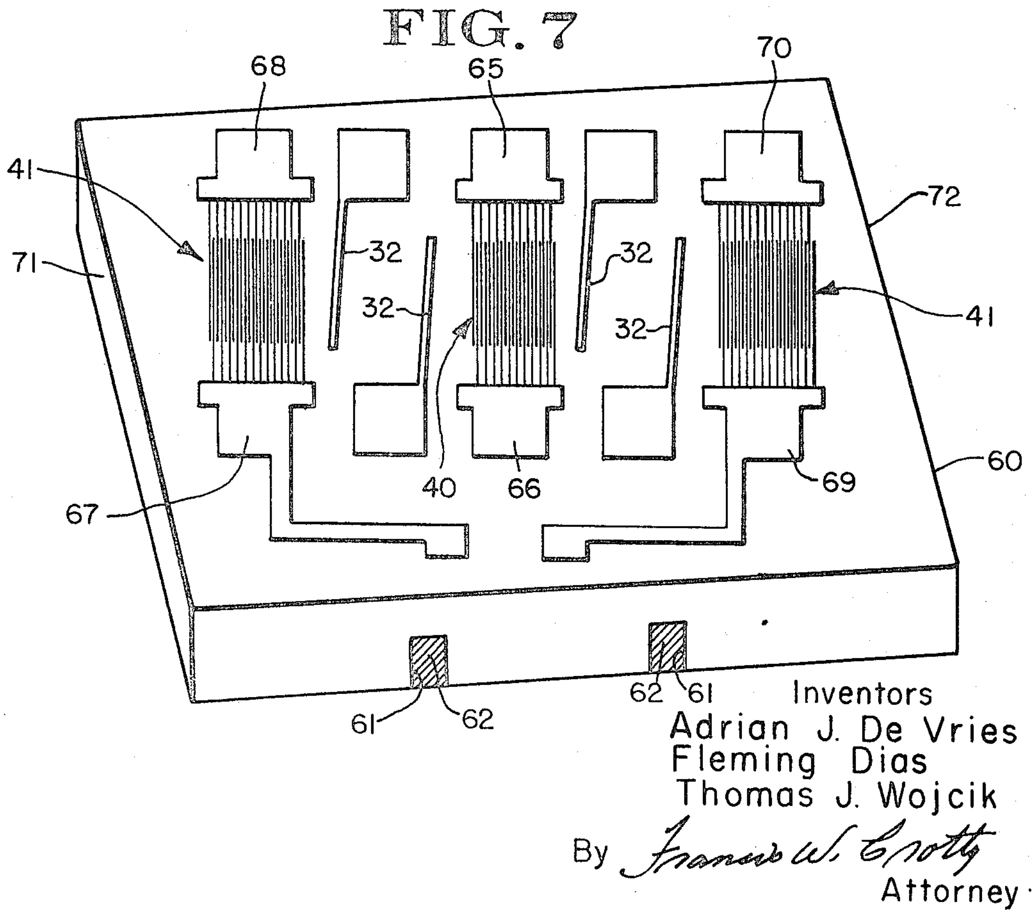
FIG. 7 is a perspective view of an even further embodiment of an acoustic filter system.

For the purpose of emphasizing the extremely small dimensions that may be involved and also of illustrating one practical filter version that has been constructed and successfully demonstrated, FIG. 7 depicts one form of the acoustic filter with a magnification (in the drawings) of approximately 25 times. Substrate 60 in this case has a length of 0.250 inch, a width of 0.180 inch and a thickness of 0.040 inch. Shielding channels 61, in this case entirely filled with a conductive metal 62, have a depth of 0.020 inch and a width of 0.010 inch. Input transducer 40 is formed by depositing the lines of the interleaved comb arrays between and respectively coupled to opposing connecting areas or "pads" 65 and 66 also deposited on the surface of substrate 60. In the same way, output transducers 41 and their associated connecting pads 67—70 are deposited, as are shields 32 and their connecting pads, upon substrate 60. In practice, the arrangement of FIG. 7 has been found to represent an excellent compromise between obtaining a maximum of shielding effect in order to block the translation of crosstalk while at the same time minimizing the increased shunt capacitance of the filter contributed by the shield elements.

As described in copending application Ser. No. 808,920, filed Mar. 20, 1969, by Adrian J. DeVries and assigned to the assignee of the present application, the different connecting pads may be interconnected in various ways so that a selection can be made between coupling output transducers 41 in series or in parallel; by virtue of that selection, a choice of different output impedance levels is afforded. Moreover, selection of the mode of interconnection of transducers 41 permits either a balanced or unbalanced output. For example, by connecting pads 67 and 69 in common to ground, a balanced output signal is obtained across pads 68 and 70. At the same time, when the input source is unbalanced, pad 65 preferably is connected to ground while pad 66 is connected to the ungrounded side of the signal source. This aids in further surpressing crosstalk as described in connection with FIG. 1. As so connected, FIG. 7 constitutes an example of converting between an unbalanced input and a balanced output.

As in the previous FIGS., the wave propagation paths are defined by the location of the transducers and extend generally therebetween. As shown, the transducers are disposed so that those paths are oriented at an acute angle to the opposing end surfaces 71 and 72 of substrate 60. In use, a portion of the waves launched by input transducer 40 continue through output transducers 41 and subsequently are reflected by end surfaces 71, 72. By virtue of the angle formed between the wave propagation paths and those end surfaces, the reflected waves that reenter the surface area occupied by transducers 41 exhibit wavefronts at an angle to the teeth of the comb arrays, so that very little, if any, interaction occurs between those reflected waves and the transducers. Consequently, the arrangement of FIG. 7 avoids the additional development of delayed signals produced in the output transducers by reflected waves.

By including one or more of the described shielding and related techniques, the performance of the acoustic filters is significantly enhanced through elimination or at least substantial reduction of the dual transmission of both a desired signal and a crosstalk signal. The several different crosstalk reduction approaches may be employed either individually or cumulatively, depending upon the needs of the particular application and filter configuration selected. Whatever the kind and combination of decoupling arrangements chosen in a given case, the result is to enable greater flexibility in the choice of transducer construction and the formation of the entire filter assembly as an extremely small unit which may be integrated together with other circuit elements and stages the entire assembly of which is of minimal size.

While emphasis herein has been placed upon the attainment of such features as maximum desired signal transmission with minimum concurrent transmission of other versions of the same signal having a different time delay, it is to be noted that amplification may also be produced in any of the embodiments by incorporating the principles disclosed in Adler application Ser. No. 499,936, filed Oct. 21, 1965, now abandoned and assigned to the same assignee. Briefly, such amplification is obtained by means of traveling wave interaction between the surface waves induced in the piezoelectric material and charge carriers drifting in a semiconductive environment.

Although particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

We claim:

1. An acoustic filter comprising:

a body of piezoelectric material propagative of acoustic surface waves along a surface thereof;

a first surface wave interaction device, including a pair of comb-type electrode arrays interleaved with one another, actively coupled to a portion of said surface and having interaction with said body over a predetermined frequency range;

a second surface wave interaction device, likewise including a pair of comb-type electrode arrays interleaved with one another, actively coupled to a portion of said surface spaced from said first device by a distance along said surface and defining with said first device a surface wave propagation path that is sufficiently small to effect passive coupling between said devices over said frequency range; and decoupling means, coupling to a plane of reference potential the one electrode array of each of said devices that is physically closest to the other of said devices, for reducing the magnitude of said passive coupling.

2. A filter as defined in claim 1 in which said comb-type electrode arrays of each of said devices extend in opposite directions across said path, and in which said decoupling means couples to said reference plane an electrode array of one of said devices that extends in one direction across said path and an electrode array of the other of said devices that extends in the opposite direction across said path.

3. A filter as defined in claim 1 in which said decoupling means comprises an electrode that is disposed to define an acute angle with the direction of said path.

4. A filter as defined in claim 1 in which said decoupling means includes means for effecting development of the signal across at least one of said pairs of electrode arrays in balanced relationship with respect to said plane of reference potential.

5. An acoustic filter comprising:

a body of piezoelectric material propagative of acoustic surface waves along a surface thereof;

a first surface wave interaction device, including a pair of comb-type electrode arrays interleaved with one another, actively coupled to a portion of said surface and having interaction with said body over a predetermined frequency range;

a second surface wave interaction device, likewise including a pair of comb-type electrode arrays interleaved with one another, actively coupled to a portion of said surface spaced from said first device by a distance along said surface and defining with said first device a surface wave propagation path that is sufficiently small to effect passive coupling between said devices over said frequency range; and decoupling means for reducing the magnitude of said passive coupling comprising at least one channel, oriented laterally of said path, in a surface of said body opposite said devices.

6. A filter as defined in claim 5 in which an electrically conductive shield is disposed in at least a portion of said channel and coupled to a plane of reference potential.

7. An acoustic filter comprising:

a body of piezoelectric material propagative of acoustic surface waves along a surface thereof;

a first surface wave interaction device, including a pair of comb-type electrode arrays interleaved with one another, actively coupled to a portion of said surface and having interaction with said body over a predetermined frequency range;

a second surface wave interaction device, likewise including a pair of comb-type electrode arrays interleaved with one another, actively coupled to a portion of said surface spaced from said first device by a distance along said surface and defining with said first device a surface wave propagation path that is sufficiently small to effect passive coupling between said devices over said frequency range; and said devices being so oriented that said propagation path forms an acute angle to at least one end surface of said body of piezoelectric material.